United States Patent Office 3,211,629
Patented Oct. 12, 1965

3,211,629
METHOD FOR PRODUCING XANTHYLIC ACID BY MICROORGANISMS
Shigeo Abe, Tokyo, Kiyoshi Udagawa, Yokohama, Takashi Nara, Tokyo, and Masanaru Misawa, Kawasaki-shi, Japan, assignors to Kyowa Hakko Kogyo Co., Ltd., Tokyo, Japan, a corporation of Japan
No Drawing. Filed Oct. 7, 1963, Ser. No. 314,520
Claims priority, application Japan, Oct. 12, 1962, 37/44,142
5 Claims. (Cl. 195—28)

The present invention relates to a method for producing xanthylic acid with the aid of microorganisms. More particularly this invention relates to an economical method for producing xanthylic acid (xanthosine-5′-phosphate) by culturing nutrient-requiring microorganisms in culture medium containing inexpensive carbon sources, nitrogen sources, inorganic substances and nutrients necessary for the microorganisms.

Xanthylic acid is a kind of purine nucleotide and an important intermediate in the biosynthesis of ribonucleic acid and deoxyribonucleic acid in cells of microorganisms. As is well known, xanthylic acid has a widespread use in the field of food seasonings, medicines and the like.

A primary object of the present invention is the embodiment of an economical method for producing nucleic acid constituting components and metabolic components with the aid of microorganisms and is based on the observation that certain kinds of nutrient-requiring microorganisms (biochemical mutants) accumulate a large amount of xanthylic acid in fermentation medium. As hereinafter described, the objective commercially feasible production method has been embodied by providing suitable conditions of culture for the accumulation of xanthylic acid. By employing *Micrococcus glutamicus* 534 (ATCC 13032) and *Brevibacterium ammoniagenes* (ATCC 6871 and 6872) as individual original strains, repeated treatment thereof by irradiation (UV-ray, γ-ray, etc.) or by chemical agents (nitrogen mustard, etc) imum nutrient medium (containing each 10 μg./ml. of amino acids and vitamins) biochemical mutants of each individual bacterium shown in the specific examples of the present application which has the capability of producing xanthylic acid requires guanine or its substituted derivatives or other substances containing guanine for its growth in the minimum medium. A culture medium containing suitable amounts of sugar, other carbon sources, nitrogen sources, inorganic substances, guanine sources and other nutrients is useful. Guanine sources are free guanine, its derivatives (ribo-, deoxyriboside or ribo-, deoxyribotide), nucleic acids (RNA, DNA) and other materials (yeast extract, etc.) containing nucleic acids and/or their hydrolyzates. As for microorganisms to be used, bacteria, moulds, yeasts and other microorganisms which need guanine or its substituted derivatives or other substances containing guanine for their growth can be used. Fermentation is performed under aerobic conditions such as shaking culture or aerobic stirring culture; the culturing temperature is from 20 to 40° C., and the pH of the culturing medium is kept at 5.0 to 9.0. If necessary, a neutralizing agent is used. After a culturing period of 2 to 8 days for bacteria and yeasts, 3 to 10 days for moulds and sterptomyces, a considerable amount of xanthylic acid is accumulated in the fermentation medium and the cells of microorganisms. After the fermentation is over, the resultant product is separated.

In short, the method of this invention lies in the use of biochemical mutants which are produced by inducing mutation of known microorganisms by per se known methods, effecting direct fermentation with said mutants in the culture medium containing cheap sugar sources, or carbon sources, nitrogen sources, inorganic substances, guanine sources and other nutrients, thereby accumulating xanthylic acid in the fermentation medium, and obtaining the product after separating either by single or by simultaneous use of ion-exchange treatment, adsorption method, precipitation method and extraction method.

| Strain used | | Original strain | |
|---|---|---|---|
| Strain and No. | Requiring nutrient | Strain and No. | Requiring nutrient |
| *Micrococcus glutamicus* No. 62101 (ATCC 15135). | Guanine and biotin. | *Micrococcus glutamicus* 534 (ATCC 13032). | Biotin. |
| *Micrococcus glutamicus* No. 62110 (ATCC 15136). | Do. | *Micrococcus glutamicus* 534 (ATCC 13032). | Do. |
| *Brevibacterium ammoniagenes* No. 62201 (ATCC 15137). | Do. | *Brevibacterium ammoniagenes* (ATCC 6871). | Do. |
| *Brevibacterium ammoniagenes* No. 62221 (ATCC 15138). | Do. | *Brevibacterium ammoniagenes* (ATCC 6872). | Do. |
| *Brevibacterium ammoniagenes* No. 62223 (ATCC 15139). | Do. | *Brevibacterium ammoniagenes* (ATCC 6872). | Do. | has induced mutation. After collecting the thus-produced biochemical mutants, comparative tests have confirmed production capability of the process of this invention for xanthylic acid.

Biochemical mutants to be used in this method have hereditary characterers as shown hereinafter; the significance if any of non hereditary characters is not yet clear.

Even when each original strain of *Micrococcus glutamicus* and *Brevibacterium ammoniagenes* grows in min- The following examples of presently-preferred embodiments of the present invention are for the purpose of illustration only and are not intended to be restrictive. Percentages are by weight per volume.

*Example 1*

A mutant strain of *Micrococcus glutamicus* No. 62101 (ATCC No. 15135) (guanine and biotin requiring strain) is used. The strain is inoculated in the following preculture medium and subjected to shaking culture at 28° C. for 24 hours. The seed preculture medium is composed of 2 percent of glucose, 1 percent of peptone, 0.5 percent of yeast extract and 0.2 percent of sodium chloride, and pH of the medium is adjusted to 7.0. A 10 milliliter (ml.) aliquot of the medium is placed in a large test tube and sterilized at 120° C. for 10 minutes. Seed culture broth is inoculated into the following fermentation medium and cultured for 72 hours.

The fermentation medium is composed of 10 percent of glucose, 0.5 percent of $KH_2PO_4$, 0.5 percent of $K_2HPO_4$, 0.3 percent of urea, 0.2 percent of $(NH_4)_2SO_4$, 0.03 percent of $MgSO_4 \cdot 7H_2O$, 0.01 percent of peptone, 0.01 percent of yeast extract, 0.1 percent of corn steep liquor, 10 $\mu$g./ml. of guanine, and 2 percent of $CaCO_3$. A 30 ml. aliquot of this medium in a 250 ml. conical flask, after being adjusted to pH 7.2, is sterilized at 120° C. for 10 minutes.

5.6 mg./ml. of xanthylic acid accumulates in the fermentation broth. From this broth, the microorganism cells and insoluble $CaCO_3$ are removed. 1 liter of the resultant filtrate is made to pH 0.8 with 1 N-HCl and passed through a strongly acidic sulfonic acid-type cation exchange resin (Diaion SK No. 1, H type, product of Mitsubishi Chemicals Co., Ltd.) to adsorb xanthylic acid. After passing the filtrate, the resin is washed by water. The adsorbed xanthylic acid is eluted with HCl. Effluent containing xanthylic acid and the first portion of washing liquor are combined and concentrated under vacuum at 30° C. after being adjusted to pH 7.2 with saturated $Ba(OH)_2$. When 200 ml. of ethanol are added to 100 ml. of concentrated liquor and allowed to stand still for one whole day, crystals of barium salt of xanthylic acid are formed. After filtration and collection, the barium salt is converted to sodium salt by treatment with $Na_2SO_4$.

By elementary analysis, analysis of ribose, xanthine and phosphoric acid content, absorption spectrum of ultraviolet ray and infra-red ray, the resulting product is proved to be sodium salt of 5'-xanthylic acid. The yield is 4.1 g.

No accumulation of xanthylic acid with *Micrococcus glutamicus* 534 (ATCC 13032), original strain, is observed.

Example 2

A mutant strain of *Brevibacterium ammoniagenes* No. 62201 (ATCC No. 15137) (guanine and biotin requiring strain) is used. Fermentation medium is composed of 8 percent of glucose, 0.01 percent of casein hydrolyzate, 0.7 percent of yeast extract, 1.0 percent of $(NH_4)_2SO_4$, 0.3 percent of $KH_2PO_4$, 0.3 percent of $K_2HPO_4$, 0.05 percent of $MgSO_4 \cdot 7H_2O$, 10 $\mu$g./ml. of guanine and 10 $\mu$g./liter of biotin. It is adjusted to pH 7.2 before sterilization and 2 percent of sterilized $CaCO_3$ is added after sterilization. Other conditions are the same as in Example 1. By culture for 76 hours, 4.8 mg./ml. of 5'-xanthylic acid is accumulated.

No accumulation of xanthylic acid with *Brevibacterium ammoniagenes* ATCC 6871, original strain, is observed.

Example 3

Employing a mutant strain of *Micrococcus glutamicus* No. 62110 (ATCC No. 15136) (guanine and biotin requiring strain) culturing is performed under the same conditions as in Example 1. After culturing for 70 hours, 6.8 mg./ml. of 5'-xanthylic acid accumulates in the fermentation broth.

Example 4

Using a mutant strain of *Brevibacterium ammoniagenes* No. 62221 (ATCC No. 15138) (guanine and biotin requiring strain) culturing is performed under the same conditions as in Example 2. After culturing for 72 hours, 6.9 mg./ml. of 5'-xanthylic acid has accumulated in the fermentation broth.

No accumulation of xanthylic acid with *Brevibacterium ammoniagenes* ATCC 6872, original strain, is observed.

Example 5

Using a mutant strain of *Brevibacterium ammoniagenes* No. 62223 (ATCC No. 15139) (guanine and biotin requiring strain), culturing is performed under the same conditions as in Example 2. After 75 hours of fermentation 3.5 mg./ml. of 5'-xanthylic acid has accumulated.

In each of Examples 2, 3, 4 and 5, the accumulated xanthylic acid can be recovered after the manner described in Example 1.

These yields are as follows.

| Example: | Yield, g. |
| --- | --- |
| 2 | 4.1 |
| 3 | 5.5 |
| 4 | 5.9 |
| 5 | 3.0 |

Example 6

Employing the same mutant strain as in Example 4, culturing is performed under the same medium as in Example 2, excepting that no guanine is added and the amount of yeast extract is 1 percent. After 73 hours of fermentation 5.4 mg./ml. of 5'-xanthylic acid has accumulated.

The yield recovered after the manner described in Example 1 is 4.8 g.

Example 7

Example 6 is repeated in the same medium as in Example 2, excepting that the amount of guanine is 20 $\mu$g./ml. and no yeast extract is added. After 73 hours of fermentation 4.9 mg./ml. of 5'-xanthylic acid has accumulated.

The yield recovered after the manner described in Example 1 is 4.2 g.

Example 8

Example 6 is repeated with the same medium as in Example 2, excepting that guanine and yeast extract are not added, and guanosine is added in the amount of 35 $\mu$g./ml. After 74 hours of fermentation 4.5 mg./ml. of 5'-xanthylic acid has accumulated.

The yield recovered after the manner described in Example 1 is 4.0 g.

What is claimed is:

1. A method which comprises (a) aerobically culturing *Micrococcus glutamicus* No. 62101 (ATCC 15135) under fermentation conditions in a fermentation medium containing carbon sources, nitrogen sources, inorganic substances, guanine sources, and biotin, whereby 5'-xanthylic acid is directly produced and accumulated, (b) isolating and (c) recovering from the medium the substance so produced and accumulated.

2. A method which comprises (a) aerobically culturing *Micrococcus glutamicus* No. 62110 (ATCC 15136) under fermentation conditions in a fermentation medium containing carbon sources, nitrogen sources, inorganic substances, guanine sources, and biotin, whereby 5'-xanthylic acid is directly produced and accumulated, (b) isolating and (c) recovering from the medium the substance so produced and accumulated.

3. A method which comprises (a) aerobically culturing *Brevibacterium ammoniagenes* No. 62201 (ATCC 15137) under fermentation conditions in a fermentation medium containing carbon sources, nitrogen sources, inorganic substances, guanine sources and biotin, whereby 5'-xanthylic acid is directly produced and accumulated, (b) isolating and (c) recovering from the medium the substance so produced and accumulated.

4. A method which comprises (a) aerobically culturing *Brevibacterium ammoniagenes* No. 62221 (ATCC 15138) under fermentation conditions in a fermentation medium containing carbon sources, nitrogen sources, inorganic substances, guanine sources and biotin, whereby 5'-xanthylic acid is directly produced and accumulated, (b) isolating and (c) recovering from the medium the substance so produced and accumulated.

5. A method which comprises (a) aerobically culturing *Brevibacterium ammoniagenes* No. 62223 (ATCC 15139) under fermentation conditions in fermentation medium containing carbon sources, nitrogen sources, inorganic substances, guanine sources and biotin, whereby 5'-xanthylic acid is directly produced and accumulated, (b) isolating and (c) recovering from the medium the substance so produced and accumulated.

References Cited by the Examiner

UNITED STATES PATENTS 3,102,079 8/63 Kinoshita.
3,152,966 10/64 Kinoshita et al.

A. LOUIS MONACELL, *Primary Examiner.*